US011505686B2

(12) United States Patent
Gahleitner et al.

(10) Patent No.: US 11,505,686 B2
(45) Date of Patent: Nov. 22, 2022

(54) POLYPROPYLENE COMPOSITION WITH IMPROVED SEALING BEHAVIOUR

(71) Applicant: BOREALIS AG, Vienna (AT)

(72) Inventors: Markus Gahleitner, Linz (AT); Jingbo Wang, Linz (AT); Klaus Bernreitner, Linz (AT); Peter Niedersuss, Linz (AT); Friedrich Berger, Linz (AT); Stefan Ortner, Linz (AT)

(73) Assignee: BOREALIS AG, Vienna (AT)

( * ) Notice: Subject to any disclaimer, the term of this patent is extended or adjusted under 35 U.S.C. 154(b) by 156 days.

(21) Appl. No.: 16/955,642

(22) PCT Filed: Jan. 2, 2019

(86) PCT No.: PCT/EP2019/050016
§ 371 (c)(1),
(2) Date: Jun. 18, 2020

(87) PCT Pub. No.: WO2019/134904
PCT Pub. Date: Jul. 11, 2019

(65) Prior Publication Data
US 2020/0385556 A1 Dec. 10, 2020

(30) Foreign Application Priority Data

Jan. 5, 2018 (EP) .................................. 18150400

(51) Int. Cl.
*C08L 23/14* (2006.01)
*C08L 23/16* (2006.01)
*B29C 48/08* (2019.01)
*C08J 5/18* (2006.01)
*C08L 23/08* (2006.01)
*B29K 23/00* (2006.01)

(52) U.S. Cl.
CPC .............. *C08L 23/14* (2013.01); *B29C 48/08* (2019.02); *C08J 5/18* (2013.01); *C08L 23/0815* (2013.01); *C08L 23/16* (2013.01); *B29K 2023/14* (2013.01); *C08L 2203/162* (2013.01); *C08L 2205/02* (2013.01); *C08L 2314/02* (2013.01)

(58) Field of Classification Search
CPC .... C08L 23/16; C08L 23/14; C08L 2203/162; C08L 2205/00
See application file for complete search history.

(56) References Cited

U.S. PATENT DOCUMENTS

| 5,358,792 A | 10/1994 | Mehta et al. |
| 2005/0142367 A1 | 6/2005 | Su et al. |
| 2019/0225723 A1* | 7/2019 | Gahleitner .............. C08L 23/16 |

FOREIGN PATENT DOCUMENTS

| CN | 1308387 C | 4/2007 | |
| EA | 14019 B1 | 8/2010 | |
| EP | 0887379 A1 | 12/1998 | |
| EP | 2610271 A1 | 7/2013 | |
| EP | 2610272 A1 | 7/2013 | |
| EP | 3031849 A1 | 6/2016 | |
| EP | 3064548 A1 | 9/2016 | |
| EP | 3124567 A1 | 2/2017 | |
| EP | 2698251 B1 | 3/2017 | |
| RU | 2248885 C2 | 3/2005 | |
| RU | 2458734 C2 | 8/2012 | |
| RU | 2494112 C2 | 9/2013 | |
| RU | 2716598 C2 | 3/2020 | |
| WO | 9212182 A1 | 7/1992 | |
| WO | 9924478 A1 | 5/1999 | |
| WO | 9924479 A1 | 5/1999 | |
| WO | 0068315 A1 | 11/2000 | |
| WO | 03000754 A1 | 1/2003 | |
| WO | 03000757 A1 | 1/2003 | |
| WO | 03031514 A1 | 4/2003 | |
| WO | 2004090899 A1 | 12/2003 | |
| WO | 2004029112 A1 | 4/2004 | |
| WO | 2004111095 A1 | 12/2004 | |
| WO | 2007137853 A1 | 12/2007 | |
| WO | 2011064119 A1 | 6/2011 | |
| WO | WO 2011/064119 A1 * | 6/2011 | .............. C08L 23/14 |
| WO | 2012007430 A1 | 1/2012 | |
| WO | 2016091923 A1 | 6/2016 | |
| WO | WO 2016/091925 A1 * | 6/2016 | .............. C08L 23/12 |
| WO | 2016/0162359 A1 | 10/2016 | |
| WO | 2016198601 A1 | 12/2016 | |

OTHER PUBLICATIONS

Singh, G., Kothari, A., Gupta, V., Polymer Testing 28 5 (2009), 475.
Randall, J. Macromol. Sci., Rev. Macromol. Chem. Phys. 1989, C29, 201.
Juan J. Bravo-Suárez, et al."Review of the Synthesis of Layered Double Hydroxides: A Thermodynamic Approach" Quim. Nova, vol. 27, No. 4, 601-614, 2004.
Qiu, X., Redwine, D., Gobbi, G., Nuamthanom, A., Rinaldi, P., Macromolecules 2007, 40, 6879.
Pollard, M., Klimke, K., Graf, R., Spiess, H.W., Wilhelm, M., Sperber, O., Piel, C., Kaminsky, W., Macromolecules 2004;37:813.
Parkinson, M., Klimke, K., Spiess, H.W., Wilhelm, M., Macromol. Chem. Phys. 2007;208:2128.
NMR Spectroscopy of Polymers: innovative Strategies for Complex Macromolecules, Chapter 24, 401 (2011).
Liu, W., Rinaldi, P., McIntosh, L., Quirk, P., Macromolecules 2001, 34, 4757.
Klimke, K., Parkinson, M., Piel, C., Kaminsky, W., Spiess, H.W., Wilhelm, M., Macromol. Chem. Phys. 2006;207:382.
Kakugo, M., Naito, Y., Mizunuma, K., Miyatake, T. Macromolecules 15 (1982) 1150.
Griffin, J.M., Tripon, C., Samoson, A., Filip, C., and Brown, S.P., Mag. Res. in Chem. 2007 45, S1, S198.

(Continued)

Primary Examiner — Rip A Lee
(74) Attorney, Agent, or Firm — Tarolli, Sundheim, Covell & Tummino LLP

(57) ABSTRACT

New polypropylene composition which combines low sealing initiation temperature (SIT), high hot-tack and good mechanical properties, like high dart drop strength (DDI), and its use especially for film applications.

14 Claims, No Drawings

(56) References Cited

OTHER PUBLICATIONS

Filip, X., Tripon, C., Filip, C., J. Mag. Resn. 2005, 176, 239.
Cheng, H. N., Macromolecules 17 (1984), 1950.
Resconi, L., Cavallo, L., Fait, A., Piemontesi, F., Chem. Rev. 2000, 100, 1253.
Castignolles, P., Graf, R., Parkinson, M., Wilhelm, M., Gaborieau, M., Polymer 50 (2009) 2373.
Busico, V., Cipullo, R., Monaco, G., Vacatello, M., Segre, A.L., Macromolecules 30 (1997) 6251.
Busico, V., Carbonniere, P., Cipullo, R., Pellecchia, R., Severn, J., Talarico, G., Macromol. Rapid Commun. 2007, 28, 1128.
Zhou, Z., Kuemmerle, R., Qiu, X., Redwine, D., Cong, R., Taha, A., Baugh, D. Winniford, B., J. Mag. Reson. 187 (2007) 225.
Wang, W-J., Zhu, S., Macromolecules 33 (2000), 1157.
Busico, V., Cipullo, R., Prog. Polym. Sci. 26 (2001) 443.
Extended European Search Report for Application No. 18150400. 2-1102 dated Jun. 7, 2018.
International Preliminary Report on Patentability for International Application No. PCT/EP2019/050016 dated Nov. 15, 2019.
International Search Report for International Application No. PCT/EP2019/050016 dated Apr. 1, 2019.
Russian Search Report for Application No. 202123774/04/(041086), Filed: Jan. 2, 2019; dated Feb. 10, 2021; 5 pgs.
Russian Request of the Substantive Examination for Application No. 202123774/04/(041086), Filed: Jan. 2, 2019; dated Feb. 12, 2021; 12 pgs.
Indian Examination Report for Application No. 202017030208, Filed: Jul. 15, 2020; dated Mar. 11, 2021; 5 pgs.

\* cited by examiner

POLYPROPYLENE COMPOSITION WITH IMPROVED SEALING BEHAVIOUR

The present invention relates to a new polypropylene composition which combines low sealing initiation temperature (SIT), high hot-tack properties and good mechanical properties such as a high dart drop strength (DDI). The present invention is furthermore related to the use of the polypropylene composition and articles made therefrom.

BACKGROUND OF THE INVENTION

Polypropylenes are suitable for many applications

For instance polypropylene (PP) is applicable in areas where sealing properties play an important role, like in the food or medical packing industry.

Heat sealing is the predominant method of manufacturing flexible and semi-rigid packages. An important indication of good sealing performance is inter alia a low seal initiation temperature (SIT), which is needed to support high speed on packaging machines. To ensure fast sealing, a low SIT is of advantage. By operating at lower temperature there is the benefit that the article to be sealed is not exposed to high temperatures. There are also economic advantages since lower temperatures are of course cheaper to generate and maintain.

There are further advantages by avoiding high sealing temperatures, especially when temperature sensitive goods are to be packed.

Particularly demanding applications of films, like form and fill packaging require, besides low seal initiation temperature, good hot-tack properties. Hot-tack is the bonding strength measurable while the polymer in the heat sealed portion of a film is in a semimolten/solidifying state.

This bonding strength is expressed here and hereafter in the hot tack force (N) needed to tear apart sealed layers. The hot-tack is generally an important factor to improve the efficiency of a packaging production process.

Furthermore packaged goods, like packaged food or medicals, needs to withstand a sterilization step, like steam sterilization. Steam sterilization is normally operated under a temperature of more than 120° C., like 121° C. This means that the melting temperature of the packaging film needs to be significantly higher, like more than 125° C., preferably more than 130° C.

All film manufacturers, whether making multilayer or monolayer films are looking to maximise the properties of the film it produces. Maximisation of properties is normally easier with multilayer films as each layer can be tailored to provide a particular attribute of need. It is common for example to use an outer layer which can give rise to good sealing properties whilst a core layer might be used to provide mechanical strength to a film. Moreover, when using a multilayer construction, incompatibility between film components can be avoided by placing these in separate layers.

When a film is mono-layered however, the options available to the film manufacturer are much more limited. It is currently very difficult to prepare monolayer films having optimal properties, e.g. good mechanical and processing properties and the person skilled in the art is therefore looking for new films which can provide improvements to these. Especially problematic are optical properties as the more components used in a monolayer film, the higher the haze value of the film tends to be.

The problem faced by the film manufacturer is that by trying to improving one property, another equally important property tends to be detrimentally affected. There are also real problems of compatibility between different polymers in a monolayer construction where all components are extruded together as a blend. If polymer components are not compatible, inhomogeneity is evident in the formed film which is unacceptable for the manufacturer and consumer. This limits still further the parameters which the film chemist can manipulate.

Additional important properties are mechanical properties. Film manufacturer are generally looking for a combination of high stiffness and high impact strength, which provide the potential of light weight solutions, meaning less material at similar performance not only for cos saving but also for environmental protection.

Several attempts have been made to solve the problems mentioned above.

US 20050142367 proposes to use a blend of a propylene-1-butene-ethylene terpolymer with a metallocene catalyzed ethylene polymer for a heat sealable skin layer of a three-layer BOPP film to provide low seal initiation temperature (SIT) and good hot-tack properties.

The metallocene catalyzed ethylene polymer can have a melt flow rate ($MFR_2$; 190° C., 2.16 kg) in the range of from 2.0 to 7.5 g/10 min and a density in the range of from 0.878 to 0.900 $g/cm^3$.

The propylene-1-butene-ethylene terpolymer used in the examples contains a relatively high amount of comonomers, namely 1.1 wt % (i.e. 1.7 mol %) of ethylene and 20.0 wt % (i.e. 16.2 mol %) of 1-butene.

The melting point of such compositions will be by far too low in order to withstand steam sterilization at >120° C. In addition the SIT is too low as well (71-93° C.), which also creates problems in steam sterilization.

Optical properties like haze are not mentioned.

According to WO 2011064119 the hot tack strength values obtained in the Examples of US 20050142367 are lower than about 2.5 N (i.e. 250 g/in) and at about 99° C. the hot tack strength is lower than 2.0 N (i.e. 200 g/in).

That is why WO 2011064119 proposes polyolefin compositions useful in the preparation of heat-sealable films, containing propylene copolymers and other polyolefin components, in particular polyolefin compositions comprising, all percentages being by weight:

a) from 60 to 94% of one or more copolymers of propylene with one or more comonomers selected from ethylene, a C4-C8 alpha-olefin and combinations thereof, where the comonomer, or comonomers, content in (a) is from 5 to 25%, preferably from 7 to 20%;

b) from 2 to 20% of one or more homo or copolymers of butene-1 and c) from 1 to 20% of an elastomeric or plastomeric polyolefin or polyolefin composition.

The films produced are again bi-axially oriented 3-layer films.

Disadvantages of the compositions of WO2011064119 are that the hot-tack which is achieved with at least 3 components in the composition is too low and the melting points of such compositions will be by far too low in order to withstand steam sterilization at >120° C. In addition the SIT is too low as well (<70° C.) which creates problems in steam sterilization as well.

WO 2016091923 discloses films based on a blend of a propylene copolymer and an ethylene based plastomer with sealing initiation temperature (SIT) of at most 140° C. The Examples shown in WO 2016091923 use propylene-ethylene copolymers and ethylene based plastomer with a melt flow rate ($MFR_2$; 190° C., 2.16 kg) up to 10.0 g/10 min. The films prepared with these blends after surface treatment using a Corona Generator G20S show a sealing initiation temperature (SIT) at which the seal strength has reached 1.5 N in the range of from 127° C. to 138° C. This is by far too high.

No values for hot-tack and haze are indicated.

Also EP 3031849 discloses films based on a blend of a propylene copolymer and an ethylene based plastomer, the films having a haze according to ASTM D1003 for a film thickness of 50 μm of at most 2.0%.

The examples shown in EP 3031849 use propylene-ethylene copolymers and ethylene based plastomer with a melt flow rate (MFR$_2$; 190° C., 2.16 kg) up to 10.0 g/10 min, the films are again after surface treated using a Corona Generator G20S.

No values for hot-tack and sealing initiation temperature (SIT) are indicated, but based on the compositions shown in the examples, SIT is expected to be by far too high (>130° C.).

However, although much development work has already been done in the field of films suitable for different kinds of packaging, the films as disclosed in the prior art still do not provide a sufficient balance of low sealing initiation temperature (SIT) in combination with high hot-tack and improved optics, which are in addition suitable for sterilization, so that there exists a need for novel and improved film structures, providing films with improved sealing behaviour, i.e. lower sealing initiation temperature (SIT) and higher hot-tack force, in combination with improved optics and high melting temperature.

Surprisingly the inventors found, that the above problems can be solved with the use of a polymer blend comprising a specific propylene polymer and an ethylene-based plastomer.

SUMMARY OF THE PRESENT INVENTION

Accordingly, the present invention relates to a polypropylene composition comprising
(A) a polymer blend comprising
(A-1) from 51.0 wt % to less than 80.0 wt %, based on the total amount of the polymer blend, of a propylene polymer including two different comonomer units selected from ethylene and alpha-olefins having from 4 to 12 carbon atoms randomly distributed in the propylene polymer chain comprising
  (i) ethylene-derived comonomer units in an amount of 0.3 wt % to 4.0 wt %, based on the total amount of monomer units in the propylene polymer, and
  (ii) comonomer units derived from alpha-olefins having from 4 to 12 carbon atoms in an amount of 4.0 wt % to 16.0 wt %, based on the total amount of monomer units in the propylene polymer,
  whereby the propylene polymer has a melt flow rate MFR$_2$ in the range of 0.5 g/10 min to 20.0 g/10 min, determined according to ISO 1133 at a temperature of 230° C. and a load of 2.16 kg; and
(A-2) from more than 20.0 to 49.0 wt %, based on the total amount of the polymer blend, of an ethylene-based plastomer having a density of from 0.850 g/cm$^3$ to 0.915 g/cm$^3$, determined according to ISO 1183, and a melt flow rate MFR$_2$ in the range of 5.0 g/10 min to 50.0 g/10 min, determined according to ISO 1133 at a temperature of 190° C. and a load of 2.16 kg; and
(B) optionally one or more additives in a total amount of from 0.0 to 5.0 wt %, based on the total amount of the polypropylene composition, selected from the group consisting of slip agents, anti-block agents, UV stabilizers, alpha- and/or beta-nucleating agents, antistatic agents and antioxidants.

It has surprisingly been found out that such polypropylene compositions have an optimized or improved sealing behaviour, i.e. low sealing initiation temperature SIT and high hot-tack, in combination with beneficial mechanical properties such as good impact properties e.g. in dart drop strength and acceptable stiffness e.g. in tensile modulus.

In a further aspect present invention relates to a process for preparing a polypropylene composition according to any of the preceding claims, wherein the process comprises the steps of:
(i) preparing the propylene polymer by polymerizing propylene and two different comonomer units selected from ethylene and alpha-olefins having from 4 to 12 carbon atoms in the presence of a Ziegler-Natta catalyst,
(ii) mixing said propylene polymer with the ethylene-based plastomer, optionally in the presence of one or more additives, to obtain a mixture of said propylene polymer and ethylene-based plastomer, and
(iii) extruding said mixture to obtain said polypropylene composition.

Additionally, the present invention relates to an article comprising the polypropylene composition as defined above or below. Said article is suitably an unoriented mono-layered or multi-layered film.

In a further aspect, the present invention relates to the use of the polypropylene composition as defined above or below for the production of an article, such as an unoriented mono-layered or multi-layered film.

Still further, the present invention also relates to the use of said film as defined above or below as sealing layer in a multi-layered film.

Definitions

A polymer blend is meant as mixture of two or more polymeric components. In general the blend can be prepared by mixing the two or more polymeric components.

Suitable mixing procedures known in the art are in-situ blending during the polymerization process and post-polymerization blendings. During in-situ-blending the polymeric components produced in different stages of a multistage polymerisation process are blended by polymerizing one polymeric component in the presence of another polymeric component polymerized in a prior stage. Post-polymerization blendings can be dry-blendings of polymeric components such as polymer powders and/or compounded polymer pellets or melt blending by melt mixing the polymeric components. In the present invention the polymer blend is preferably prepared by post-polymerization blending of the polymeric components, such as the obligatory propylene polymer and ethylene-based plastomer.

A propylene random copolymer is a copolymer of propylene monomer units and comonomer units in which the comonomer units are distributed randomly over the polypropylene chain. Thereby, a propylene random copolymer includes a fraction, which is insoluble in xylene—xylene cold insoluble (XCU) fraction—in an amount of at least 70 wt %, more preferably of at least 80 wt %, still more preferably of at least 85 wt %, most preferably of at least 88 wt %, based on the total amount of propylene random copolymer. Accordingly, the propylene random copolymer does not contain an elastomeric polymer phase dispersed therein.

A propylene random terpolymer is a specific form of a propylene random copolymer in which two different comonomer units, such as e.g. ethylene and 1-butene comonomer units, are distributed randomly over the polypropylene chain.

Usually, a propylene polymer comprising at least two propylene polymer fractions (components), which have been produced under different polymerization conditions resulting in different (weight average) molecular weights and/or different comonomer contents for the fractions, preferably produced by polymerizing in multiple polymerization stages with different polymerization conditions, is referred to as "multimodal". The prefix "multi" relates to the number of different polymer fractions the propylene polymer is consisting of. As an example of multimodal propylene polymer, a propylene polymer consisting of two fractions only is called "bimodal", whereas a propylene polymer consisting of three fractions only is called "trimodal".

A unimodal propylene polymer only consists of one fraction.

Thereby, the term "different" means that the propylene polymer fractions differ from each other in at least one property, preferably in the weight average molecular weight—which can also be measured in different melt flow rates of the fractions—or comonomer content or both.

A plastomer is a polymer which combines the qualities of elastomers and plastics, such as rubber-like properties with the processing abilities of plastic.

An ethylene-based plastomer is a plastomer with a molar majority of ethylene monomer units.

In the following, amounts are given as % by weight (wt %) unless it is stated otherwise.

DETAILED DESCRIPTION

In the following the individual components are defined in more detail.

The polypropylene composition of the present inventions comprises (A) a polymer blend of
(A-1) a propylene polymer and
(A-2) an ethylene-based plastomer.
Component (A-1): Propylene Polymer The propylene polymer used in the polymer blend of the polypropylene composition of the invention is a random copolymer of propylene including two different comonomer units selected from ethylene and alpha-olefins having from 4 to 12 carbon atoms.

Preferably, the comonomer units are selected from ethylene as one obligatory comonomer units and other alpha-olefins selected from the group consisting of 1-butene, 1-pentene, 1-hexene, 1-heptene, 1-octene, 1-nonene and 1-decene, wherein 1-butene and 1-hexene are even more preferred.

Suitably, the propylene polymer is a random terpolymer of propylene and comprises ethylene as first comonomer units and one of C4 to C12 alpha-olefins as second comonomer units.

Accordingly, the propylene terpolymer comprises monomer units derived from propylene and from ethylene and from one further alpha-olefin selected from the group consisting of $C_4$-alpha-olefin, $C_5$-alpha-olefin, $C_6$-alpha-olefin, $C_7$-alpha-olefin, $C_8$-alpha-olefin, $C_9$-alpha-olefin, $C_{10}$-alpha-olefin, $C_{11}$-alpha-olefin, and $C_{12}$-alpha-olefin.

More preferably the propylene terpolymer comprises units derived from propylene and from ethylene and one other alpha-olefin selected from the group consisting of 1-butene, 1-pentene, 1-hexene, 1-heptene, 1-octene, 1-nonene and 1-decene, wherein 1-butene and 1-hexene are even more preferred.

It is in particular preferred that the propylene terpolymer consists of units derived from propylene, ethylene and 1-butene or from propylene, ethylene and 1-hexene. Most preferred the propylene terpolymer consists of units derived from propylene, ethylene and 1-butene.

The propylene polymer used in the polypropylene composition according to this invention is featured by a moderate to low comonomer content.

Accordingly the propylene polymer used in the polypropylene composition according to this invention shall have an ethylene content of at least 0.3 wt %.

Thus it is preferred that the propylene polymer has an ethylene content in the range of from 0.3 wt % to 4.0 wt %, more preferably in the range of from more than 0.3 wt % to 4.0 wt %, even more preferably in the range of from 0.4 to 3.5 wt %, still more preferably in the range of from 0.5 to 3.0 wt %, especially in the range of from 1.0-2.5 wt %.

Moreover, the propylene polymer shall have a $C_4$ to $C_{12}$ alpha-olefin, preferably a C4 or C6 alpha-olefin comonomer content of at least 4.0 wt %.

Thus it is preferred that the propylene polymer has an $C_4$ to $C_{12}$ alpha-olefin, preferably a C4 or C6 alpha-olefin comonomer content in the range of from 4.0 to 16.0 wt %, more preferably in the range of from more than 4.0 wt % to 16.0 wt %, even more preferably in the range of from 4.5 to 14.0 wt %, still more preferably in the range of from 5.0 to 12.0 wt %, especially in the range of from 6.0 to 10.0 wt %. Suitably, the propylene polymer is a propylene terpolymer with ethylene in the above described amount and one of the above described alpha-olefins in the above described amount.

Preferably the polymer has a rather high content of propylene (C3), i.e. more than 83.0 wt %, i.e. more than 86.0 wt %, more preferably more than 88.0 wt %, yet more preferably more than 90.0 wt %, like more than 91.0 wt %.

The propylene polymer has a melt flow rate $MFR_2$ (230° C.) measured according to ISO 1133 in the range of from 0.5 to 20.0 g/10 min, preferably in the range of from 0.8 to 15.0 g/10 min, more preferably in the range of from 1.0 to 10.0 g/10 min, still more preferably in range of from 1.2 to 8.0 g/10 min and yet more preferably in the range of 1.5 to 5.0 g/10 min.

Further, the propylene polymer can be defined by the xylene cold soluble (XCS) content measured according to ISO 6427. Accordingly the propylene polymer is preferably featured by a xylene cold soluble (XCS) content of below 20.0 wt %, more preferably of below 15.0 wt %.

Thus it is in particular appreciated that the propylene terpolymer has a xylene cold soluble (XCS) content in the range of 3.0 to below 20.0 wt %, more preferably in the range of 5.0 to 15.0 wt % and most preferably in the range of 5.0 to 12.0 wt %.

Still further, the propylene polymer can be defined by the melting temperature (Tm) measured via DSC according to ISO 11357. Accordingly the propylene polymer preferably has a melting temperature Tm of equal to or higher than 130° C. Even more preferable the melting temperature Tm is in the range of 130° C. to 140° C., most preferably in the range of 132° C. to 137° C.

The crystallisation temperature measured via DSC according to ISO 11357 of the propylene polymer should be equal or higher than 85° C., preferably in the range of 85° C. to 100° C., and even more preferably in the range of 90° C. to 100° C.

The propylene polymer can be further unimodal or multimodal, like bimodal in view of the molecular weight distribution and/or the comonomer content distribution; both unimodal and bimodal propylene polymers are equally preferred.

If the propylene polymer is unimodal, it is preferably produced in a single polymerization step in one polymerization reactor (R1). Alternatively a unimodal propylene polymer can be produced in a sequential polymerization process using the same polymerization conditions in all reactors.

If the propylene polymer is multimodal, it is preferably produced in a sequential polymerization process using different polymerization conditions (amount of comonomer, hydrogen amount, etc.) in the reactors.

The propylene polymer is preferably the propylene polymer is produced in the presence of a Ziegler-Natta catalyst system.

The propylene polymer can be produced in a single polymerization step comprising a single polymerization reactor (R1) or in a sequential polymerization process comprising at least two polymerization reactors (R1) and (R2), whereby in the first polymerization reactor (R1) a first propylene polymer fraction (R-PP1) is produced, which is subsequently transferred into the second polymerization reactor (R2). In the second polymerization reactor (R2) a second propylene polymer fraction (R-PP2) is then produced in the presence of the first propylene polymer fraction (R-PP1).

If the propylene polymer is produced in at least two polymerization reactors (R1) and (R2), it is possible that
i) in the first reactor (R1) a propylene homopolymer and in the second reactor (R2) a propylene terpolymer is produced, yielding the propylene polymer (A-1) or
ii) in the first reactor (R1) a propylene-ethylene copolymer and in the second reactor (R2) a propylene C4 to C12 alpha-olefin copolymer is produced, yielding the propylene polymer (A-1) or
iii) in the first reactor (R1) a propylene C4 to C12 alpha-olefin copolymer and in the second reactor (R2) a propylene-ethylene copolymer is produced, yielding the propylene polymer (A-1) or
iv) in the first reactor (R1) a propylene terpolymer and in the second reactor (R2) a propylene terpolymer is produced, yielding the propylene polymer (A-1).

Polymerization processes which are suitable for producing the propylene polymer generally comprises one or two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the propylene polymer is produced in at least two reactors connected in series. Accordingly such a polymerization system comprises at least a first polymerization reactor (R1) and a second polymerization reactor (R2), and optionally a third polymerization reactor (R3).

The first, respectively the single, polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

In case a "sequential polymerization process" is applied the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

Preferably the propylene polymer (A-1) according to this invention is produced in the presence of a Ziegler-Natta catalyst.

The Ziegler-Natta catalyst is fed into the first, respectively the single, polymerization reactor (R1) and is optionally transferred with the polymer (slurry) obtained in the first polymerization reactor (R1) into the subsequent reactors, if the propylene polymer is produced in a sequential polymerization process.

If the process covers also a pre-polymerization step it is preferred that all of the Ziegler-Natta catalyst is fed in the pre-polymerization reactor. Subsequently the pre-polymerization product containing the Ziegler-Natta catalyst is transferred into the first, respectively the single, polymerization reactor (R1).

Preferably, the Ziegler-Natta catalyst (ZN-C) comprises a high-yield Ziegler-Natta type catalyst including an internal donor component, which can be used at high polymerization temperatures of 80° C. or more.

Such high-yield Ziegler-Natta catalyst (ZN-C) can comprise a succinate, a diether, a phthalate etc., or mixtures therefrom as internal donor (ID) and are for example commercially available for example from LyondellBasell under the Avant ZN trade name.

Further useful solid catalysts are also those disclosed in WO-A-2003/000757, WO-A-2003/000754, WO-A-2004/029112 and WO2007/137853. These catalysts are solid catalysts of spherical particles with compact structure and low surface area of the particles. Further, these catalysts are featured by a uniform distribution of catalytically active sites thorough the catalyst particles. Catalysts are prepared by emulsion-solidification method, where no external support is needed. The dispersed phase in the form of liquid droplets of the emulsion forms the catalyst part, which is transformed to solid catalyst particles during the solidification step.

Thus, in an embodiment of the present invention, the solid catalyst component is prepared by a process comprising:
preparing a solution of magnesium complex by reacting an alkoxy magnesium compound and an electron donor or a precursor thereof in a $C_6$-$C_{10}$ aromatic liquid reaction medium;
reacting said magnesium complex with a four valent titanium compound, preferably $TiCl_4$, at a temperature greater than 10° C. and less than 50° C. to produce an emulsion of a denser, dispersed phase having Ti/Mg mol ratio 0.1 to 10 and in a continuous phase having Ti/Mg mol ratio 10 to 100; and agitating the emulsion, optionally in the presence of an emulsion stabilizer and/or a turbulence minimizing agent, in order to maintain the droplets of said dispersed phase within an average size range of 5 to 200 µm.

The catalyst particles are obtained after solidifying said droplets of the dispersed phase by heating, preferably at a temperature from 80° C. to 110° C. In said process an aluminium alkyl compound of the formula AlR3-nXn, where R is an alkyl and/or an alkoxy group of 1 to 20, preferably of 1 to 10 carbon atoms, X is a halogen and n is 0, 1 or 2, is added and brought into contact with the droplets of the dispersed phase of the agitated emulsion. Alternatively, the aluminium alkyl compound of the formula AlR3-nXn, is brought into contact with the solidified particles at the washing step before recovering the final solid particles.

Suitable internal electron donors are, among others, (di) esters of aromatic (di)carboxylic acids. Said aromatic carboxylic acid ester or diester can be formed in situ by reaction of an aromatic carboxylic acid chloride or diacid chloride with a C2-C16 alkanol and/or diol, and is preferable di-2-ethyl-hexyl phthalate.

A further suitable catalyst for the present invention is a solid Ziegler-Natta catalyst, which comprises compounds of a transition metal of Group 4 to 6 of IUPAC, like titanium, a Group 2 metal compound, like a magnesium, and an internal donor being a non-phthalic compound, more preferably a non-phthalic acid ester, still more preferably being a diester of non-phthalic dicarboxylic acids as described in more detail below. Further, the solid catalyst is free of any external support material, like silica or MgCl2, but the catalyst is self-supported.

This Ziegler-Natta catalyst can be further defined by the way as obtained.

Accordingly, the Ziegler-Natta catalyst is preferably obtained by a process comprising the steps of a)

a1) providing a solution of at least a Group 2 metal alkoxy compound (Ax) being the reaction product of a Group 2 metal compound and a monohydric alcohol (A) comprising in addition to the hydroxyl moiety at least one ether moiety optionally in an organic liquid reaction medium; or a2) a solution of at least a Group 2 metal alkoxy compound (Ax') being the reaction product of a Group 2 metal compound and an alcohol mixture of the monohydric alcohol (A) and a monohydric alcohol (B) of formula ROH, optionally in an organic liquid reaction medium; or a3) providing a solution of a mixture of the Group 2 alkoxy compound (Ax) and a Group 2 metal alkoxy compound (Bx) being the reaction product of a Group 2 metal compound and the monohydric alcohol (B), optionally in an organic liquid reaction medium; or a4) providing a solution of Group 2 alkoxide of formula M(OR1)n(OR2)mX2-n-m or mixture of Group 2 alkoxides M(OR1)n'X2-n' and M(OR2)m'X2-m', where M is Group 2 metal, X is halogen, R1 and R2 are different alkyl groups with C2 to C16 carbon atoms, and 0≤n<2, 0≤m<2 and n+m+(2−n−m)=2, provided that both n and m≠0, 0<n'≤2 and 0<m'≤2; and b) adding said solution from step a) to at least one compound of a transition metal of Group 4 to 6 and c) obtaining the solid catalyst component particles, and adding a non-phthalic internal donor, at any step prior to step c).

The internal donor or precursor thereof is added preferably to the solution of step a).

According to the procedure above the Ziegler-Natta catalyst can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c).

In emulsion—solidification method in step b) the solution of step a) is typically added to the at least one transition metal compound at a lower temperature, such as from −10° C. to below 50° C., preferably from −5° C. to 30° C. During agitation of the emulsion the temperature is typically kept at −10 to below 40° C., preferably from −5° C. to 30° C. Droplets of the dispersed phase of the emulsion form the active catalyst composition. Solidification (step c) of the droplets is suitably carried out by heating the emulsion to a temperature of 70° C. to 150° C., preferably to 80° C. to 110° C.

The catalyst prepared by emulsion—solidification method is preferably used in the present invention.

In a preferred embodiment in step a) the solution of a2) or a3) are used, i.e. a solution of (Ax') or a solution of a mixture of (Ax) and (Bx).

Preferably the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are C2 to C4 glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycolmonobutyl ether, 3-butoxy-2-propanol, with 2-(2-ethylhexyloxy)ethanol and 1,3-propyleneglycol-monobutyl ether, 3-butoxy-2-propanol being particularly preferred.

Illustrative monohydric alcohols (B) are of formula ROH, with R being a straight-chain or branched C6-C10 alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different C1-C20 alkyl, preferably C2-C10 alkyl. Typical alkylalkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R"(OH)m to obtain said magnesium alkoxide compounds. Preferred polyhydric alcohols, if used, are alcohols, wherein R" is a straight-chain, cyclic or branched C2 to C10 hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred. Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° C. to 70° C. Most suitable temperature is selected depending on the Mg compound and alcohol(s) used.

The transition metal compound of Group 4 to 6 is preferably a titanium compound, most preferably a titanium halide, like $TiCl_4$.

The non-phthalic internal donor that can be used in the preparation of the catalyst is preferably selected from (di) esters of non-phthalic carboxylic (di)acids, 1,3-diethers, derivatives and mixtures thereof. Especially preferred donors are diesters of monounsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from alpha-olefin polymers of alpha-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m2, more preferably below 10 g/m². Typically the amount of Ti is 1 to 6 wt %, Mg 10 to 20 wt % and donor 10 to 40 wt % of the catalyst composition.

Detailed description of preparation of catalysts is disclosed in WO 2012/007430, EP2610271, EP261027 and EP2610272.

The Ziegler-Natta catalyst is optionally modified by the so called BNT-technology during a pre-polymerization step in order to introduce a polymeric nucleating agent. Such a polymeric nucleating agent is preferably a vinyl polymer, such as a vinyl polymer derived from monomers of the formula

wherein $R_1$ and $R_2$, together with the carbon atom they are attached to, form an optionally substituted saturated or unsaturated or aromatic ring or a fused ring system, wherein the ring or fused ring moiety contains 4 to 20 carbon atoms, preferably 5 to 12 membered saturated or unsaturated or aromatic ring or a fused ring system or independently represent a linear or branched $C_4$-$C_{30}$-alkane, $C_4$-$C_{20}$-cycloalkane or $C_4$-$C_{20}$-aromatic ring. Preferably $R_1$ and $R_2$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

The weight ratio of vinyl compound to polymerization catalyst in the modification step of the polymerization catalyst preferably is 0.3 or more up to 40.0, such as 0.4 to 20.0 or more preferably 0.5 to 15.0, like 0.5 to 2.0.

The polymerization of the vinyl compound, e. g. VCH, can be done in any inert fluid that does not dissolve the polymer formed (e. g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e. g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oilgrease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10.0, preferably less than 3.0, more preferably about 0.1 to 2.0, and in particular about 0.1 to 1.5. It should be noted that no benefits are achieved by using vinyl compounds in excess.

Further, the reaction time of the catalyst modification by polymerization of a vinyl compound should be sufficient to allow for complete reaction of the vinyl monomer, i.e. the polymerization is continued until the amount of unreacted vinyl compounds in the reaction mixture (including the polymerization medium and the reactants) is less than 0.5 wt %, in particular less than 2000 ppm by weight (shown by analysis). Thus, when the prepolymerized catalyst contains a maximum of about 0.1 wt % vinyl compound, the final vinyl compound content in the polypropylene will be below the limit of determination using the GCMS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10° C. to 60° C., preferably 15° C. to 55° C.

General conditions for the modification of the catalyst are also disclosed in WO 00/6831, incorporated herein by reference with respect to the modification of the polymerization catalyst.

The preferred embodiments as described previously in the present application with respect to the vinyl compound also apply with respect to the polymerization catalyst of the present invention and the preferred polypropylene composition in accordance with the present invention.

Suitable media for the modification step include, in addition to oils, also aliphatic inert organic solvents with low viscosity, such as pentane and heptane. Furthermore, small amounts of hydrogen can be used during the modification.

The Ziegler-Natta catalyst is preferably used in association with an alkyl aluminum cocatalyst and optionally external donors.

As further component in the instant polymerization process an external donor is preferably present. Suitable external donors include certain silanes, ethers, esters, amines, ketones, heterocyclic compounds and blends of these. It is especially preferred to use a silane. It is most preferred to use silanes of the general formula

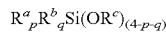

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$, or of general formula

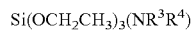

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both R3 and R4 are the same, yet more preferably both R3 and R4 are an ethyl group.

Especially preferred external donors are the dicyclopentyl dimethoxy silane donor (D-donor) or the cyclohexylmethyl dimethoxy silane donor (C-Donor).

In addition to the Ziegler-Natta catalyst and the optional external donor, a co-catalyst can be used. The co-catalyst is preferably a compound of group 13 of the periodic table (IUPAC), e.g. organo aluminum, such as an aluminum compound, like aluminum alkyl, aluminium halide or aluminum alkyl halide compound.

Accordingly, in one specific embodiment the cocatalyst is a trialkylaluminium, like triethylaluminium (TEAL), dialkyl aluminium chloride or alkyl aluminium dichloride or mixtures thereof. In one specific embodiment the co-catalyst is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] must be in the range of from 5.0 to 45.0, preferably is in the range of from 5.0 to 35.0, more preferably is in the range of from 5.0 to 25.0; and optionally (b) the mol-ratio of co-catalyst (Co) to titanium compound (TC) [Co/TC] must be in the range of above 80.0 to 500.0, preferably is in the range of from 100.0 to 350.0, still more preferably is in the range of from 120.0 to 300.0.

The propylene polymer used according to this invention is thus preferably produced in the presence of (a) a Ziegler-Natta catalyst comprising an internal donor, (b) optionally a co-catalyst (Co), and (c) optionally an external donor (ED).

Component (A-2): Ethylene-Based Plastomer

The ethylene based plastomer is a copolymer of ethylene and propylene or a $C_4$-$C_{12}$ alpha-olefin.

Suitable $C_4$-$C_{12}$ alpha-olefins include 1-butene, 1-hexene and 1-octene, preferably 1-butene or 1-octene and more preferably 1-octene.

Preferably copolymers of ethylene and 1-octene are used.

Suitable ethylene based plastomers have a density in the range of from 0.850 to 0.915 g/cm$^3$, preferably in the range of from 0.860 to 0.910 g/cm$^3$, more preferably in the range of from 0.865 to 0.905 g/cm$^3$, still more preferably in the range of from 0.870 to 0.900 g/cm$^3$, most preferably in the range of from 0.875 to 0.895 g/cm$^3$.

The MFR$_2$ (ISO 1133; 190° C.; 2.16 kg) of suitable ethylene based plastomers is in the range of from 5.0 to 50.0 g/10 min, preferably in the range of from 8.0 to 50.0 g/10 min, more preferably in the range of from 10.0 to 45.0 g/10 min and even more preferably in the range of from 15.0 to 40.0 g/10 min, like 25.0 to 35.0 g/10 min.

The melting points (measured with DSC according to ISO 11357-3) of suitable ethylene based plastomers are below 130° C., preferably below 120° C., more preferably below 110° C. and most preferably below 100° C.

Furthermore suitable ethylene based plastomers have a glass transition temperature Tg (measured with DMTA according to ISO 6721-7) of below −25° C., preferably below −30° C., more preferably below −35° C.

In case the copolymer is a copolymer of ethylene and propylene it has an ethylene content from 10.0 to 55.0 wt %, preferably from 15.0 to 50.0 wt % and more preferably from 18.0 to 48.0 wt %.

In case the copolymer is a copolymer of ethylene and a $C_4$-$C_{12}$ alpha olefin it has an ethylene content from 60.0 to 95.0 wt %, preferably from 65.0 to 90.0 wt % and more preferably from 70.0 to 88.0 wt %.

The molecular mass distribution Mw/Mn of suitable ethylene based plastomers is most often below 4.0, such as 3.8 or below, but is at least 1.7. It is preferably between 3.5 and 1.8.

Suitable ethylene based plastomers can be any copolymer of ethylene and propylene or ethylene and $C_4$-$C_{12}$ alpha olefin having the above defined properties, which are commercially available, i.a. from Borealis under the tradename Queo, from DOW under the tradename Engage or Affinity, or from Mitsui under the tradename Tafmer.

Alternately these ethylene based plastomers can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably these ethylene based plastomers are prepared by a one stage or two stage solution polymerization process, especially by high temperature solution polymerization process at temperatures higher than 100° C.

Such a process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110° C., more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_6$-$C_{10}$-hydrocarbon solvents are used.

A known solution technology suitable for the process according to the invention is the COMPACT technology.

Polymer Blend (A)

The polymer blend used in the polypropylene composition of the present invention comprises, 51.0 to less than 80.0 wt % of component (A-1), i.e. the propylene polymer as defined above and thus more than 20.0 to 49.0 wt % of component (A-2), i.e. the ethylene-based plastomer as defined above.

Preferably component (A-1), i.e. the propylene polymer, is present in the polymer blend in an amount of from 55.0 to 75.0 wt %, more preferably in an amount of from 60.0 to 70.0 wt % and even more preferably in an amount of from 62.0 to 67.0 wt %. Thus component (A-2), i.e. the ethylene-based plastomer is preferably present in the blend in an amount of from 25.0 to 45.0 wt %, more preferably in an amount of from 30.0 to 40.0 wt % and even more preferably in an amount of from 33.0 to 38.0 wt %.

The weight ratio of components (A-1) and (A-2) in the polymer blend is preferably in the range of from less than 80: more than 20 to 51:49, more preferably from 75:25 to 55:45, still more preferably from 60:40 to 70:30 and most preferably from 62:38 to 67:33.

Polymer blends suitable for the present invention can be produced by dry-blending/mixing of the blend partners or by melt mixing of the melt partners.

The polymer blend can be produced by any suitable melt mixing process at temperatures above the melting point of the respective blend. Typical devices for performing said melt mixing process are twin screw extruders, single screw extruders optionally combined with static mixers, chamber kneaders like Farrel kneaders, Banbury type mixers and reciprocating co-kneaders like Buss co-kneaders.

Preferably, the melt mixing process is carried out in a twin screw extruder with high intensity mixing segments and preferably at a temperature of 170° C. to 270° C., more preferably of 180° C. to 250° C.

It is also possible to produce the polymer blend of the present invention by dry-blending in a suitable mixing equipment, like horizontal and vertical agitated chambers, tumbling vessels, and Turbula mixers, as long as sufficient homogeneity is obtained.

Polypropylene Composition

The polypropylene composition of the present invention comprises the above defined blend (A) of component (A-1) and component (A-2) and may optionally contain one or more additives in a total amount of from 0.0 up to 5.0 wt %, based on the composition, selected from the group comprising slip agents, anti-block agents, UV stabilizers, acid scavengers, antioxidants, alpha and/or beta nucleating agents, antistatic agents, etc.

Such additives are commonly known to an art skilled person.

Slip agents are also commonly known in the art. Slip agents migrate to the surface and act as lubricants polymer to polymer and polymer against metal rollers, giving reduced coefficient of friction (CoF) as a result. Examples are fatty acid amids, like erucamides (CAS No. 112-84-5), oleamides (CAS No. 301-02-0) or stearamide (CAS No. 124-26-5).

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1, 1'-dimethylbenzyl)diphenylamine), or antioxidant blends.

Acid scavengers are also commonly known in the art. Examples are calcium stearates, sodium stearates, zinc stearates, magnesium and zinc oxides, synthetic hydrotalcite (e.g.

SHT, CAS-No. 11097-59-9), lactates and lactylates, as well as calcium stearate (CAS No. 1592-23-0) and zinc stearate (CAS No. 557-05-1);

Common antiblocking agents are natural silica such as diatomaceous earth (such as CAS No. 60676-86-0 (SuperfFloss™), CAS-No. 60676-86-0 (SuperFloss E™), or CAS-No. 60676-86-0 (Celite 499™)), synthetic silica (such as CAS-No. 7631-86-9, CAS-No. 7631-86-9, CAS-No. 7631-86-9, CAS-No. 7631-86-9, CAS-No. 7631-86-9, CAS-No. 7631-86-9, CAS-No. 112926-00-8, CAS-No. 7631-86-9, or CAS-No. 7631-86-9), silicates (such as aluminium silicate (Kaolin) CAS-no. 1318-74-7, sodium aluminum silicate CAS-No. 1344-00-9, calcined kaolin CAS-No. 92704-41-1, aluminum silicate CAS-No. 1327-36-2, or calcium silicate CAS-No. 1344-95-2), synthetic zeolites (such as sodium calcium aluminosilicate hydrate CAS-No. 1344-01-0, CAS-No. 1344-01-0, or sodium calcium aluminosilicate, hydrate CAS-No. 1344-01-0).

Suitable UV-stabilisers are, for example, Bis-(2,2,6,6-tetramethyl-4-piperidyl)-sebacate (CAS-No. 52829-07-9, Tinuvin 770); 2-hydroxy-4-n-octoxy-benzophenone (CAS-No. 1843-05-6, Chimassorb 81).

Alpha nucleating agents like sodium benzoate (CAS No. 532-32-1); 1,3:2,4-bis(3,4-dimethylbenzylidene)sorbitol (CAS 135861-56-2, Millad 3988).

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these additives are added in quantities of 100-2.000 ppm for each single component.

The optional additives are either added during blending component (A-1) and component (A-2) or are already added to component (A-1) and/or (A-2) during their production, i.e. during pelletization.

The optional additives can be added to the components (A-1), (A-2) and/or the polymer blend in form of masterbatches in which one or more additives are blended with carrier polymer in concentrated amounts. Any optional carrier polymer is calculated to the amount of additives (B), based on the amount of the total polypropylene composition.

The polypropylene composition has an $MFR_2$ (2.16 kg, 230° C.) in the range of 1.0 to 20.0 g/10 min, preferably in the range of 2.0 to 15.0 g/10 min, more preferably in the range of 2.5 to 12.0 g/10 min like in the range of 3.0 to 10.0 g/10 min.

The polypropylene composition has a melting temperature (Tm) equal or higher than 125° C., preferably equal or higher than 130° C. More preferably the melting temperature is in the range of 130° C. to 140° C.

Further, the polypropylene composition has a xylene cold soluble (XCS) content measured according to ISO 6427 of below 50.0 wt %, more preferably of below 45.0 wt %, even more preferably in the range of 20.0 wt % to 50 wt %, like in the range of 20.0 wt % to 45 wt %.

In an embodiment the MFR-ratio of the MFR of the final polypropylene composition $MFR_{final}$ to the MFR of component (A-1), i.e. the propylene polymer, $MFR_{polymer}$ is preferably equal or greater than 1.2, more preferably greater than 1.5 and even more preferably greater than 2.0.

In a specific embodiment of the present invention, the polypropylene composition as defined above or below consists of the polymer blend (A) which comprises, preferably consists of, (A-1) from 51.0 to less than 80 wt % of a random terpolymer of propylene with ethylene and 1-butene as comonomer units or a random terpolymer of propylene with ethylene and 1-hexene as comonomer units (A-1-b) comprising a) ethylene-derived comonomer units in an amount of 0.3 wt % to 4.0 wt %, based on the total amount of monomer units in the propylene polymer, and b) 1-butene or 1-hexene derived comonomer units having in an amount of 4.0 wt % to 16.0 wt %, based on the total amount of monomer units in the propylene polymer, whereby the random terpolymer of propylene (A-1) has a melt flow rate $MFR_2$ in the range of 0.5 g/10 min to 20.0 g/10 min, determined according to ISO 1133 at a temperature of 230° C. and a load of 2.16 kg, a melting temperature Tm measured via DSC according to ISO 11357 of equal or higher than 130° C. and equal to or lower than 140° C., a xylene cold soluble (XCS) amount in the range of 3.0 to below 20.0 wt % (measured according to ISO 16152, 2005, at 25° C.) and a crystallization temperature Tcr measured via DSC according to ISO 11357 of equal or higher than 85° C. and equal to or lower than 100° C.; and (A-2) from more than 20.0 to 49.0 wt % of a plastomer which is a copolymer of ethylene and 1-octene, whereby the copolymer of ethylene and 1-octene (A-2) has a density of in the range of from 0.850 g/cm³ to 0.915 g/cm³ and a melt flow rate $MFR_2$ in the range of 5.0 g/10 min to 50.0 g/10 min, determined according to ISO 1133 at a temperature of 190° C. and a load of 2.16 kg; and (B) optionally one or more additives in a total amount of from 0.0 to 5.0 wt %, based on the total amount of the polypropylene composition, selected from the group consisting of slip agents, anti-block agents, UV stabilizers, alpha- and/or beta-nucleating agents, antistatic agents and antioxidants wherein the polypropylene composition has a melt flow rate $MFR_2$ in the range of 1.0 g/10 min to 20.0 g/10 min, determined according to ISO 1133 at a temperature of 230° C. and a load of 2.16 kg, a melting temperature Tm, measured via DSC according to ISO 11357 of equal or higher than 125° C. and equal to or lower than 140° C., a xylene cold soluble (XCS) amount in the range of 20 wt % to 50 wt % (measured according to ISO 16152, 2005, at 25° C.).

Thereby, the random terpolymer of propylene, the copolymer of ethylene and 1-octene, the polymer blend, the optional additives and the polypropylene composition are preferably defined as described above or below for the propylene polymer, the ethylene-based plastomer, the polymer blend, the optional additives and the polypropylene composition.

In one aspect the present invention is also related to a process for the preparation of the polypropylene composition as define above, the process comprising the steps of (i) preparing the propylene polymer by polymerizing propylene and two different comonomer units selected from ethylene and alpha-olefins having from 4 to 12 carbon atoms in the presence of a Ziegler-Natta catalyst, (ii) mixing said propylene polymer with the ethylene-based plastomer, optionally in the presence of one or more additives, to obtain a mixture of said propylene polymer and ethylene-based plastomer, and (iii) extruding said mixture to obtain said polypropylene composition. Thereby, the propylene polymer and the ethylene-based plastomer are preferably defined as described above or below.

The mixture of said propylene polymer and ethylene-based plastomer preferably relates to the polymer blend as defined above and below.

Use

The present invention is not only directed to the instant polypropylene composition but also the use of the polypropylene composition of the present invention for preparing articles and the articles comprising the polypropylene composition of the present invention.

Suitable articles are films for flexible packaging systems, such as bags or pouches for food and pharmaceutical packaging or medical articles in general.

In an embodiment the present invention is related to an article, the article being an unoriented mono-layer film comprising the inventive polypropylene composition. Accordingly the present invention is also directed to an article, the article being an unoriented mono-layer film, like cast film or blown film, e.g. air cooled blown film, comprising at least 90 wt %, preferably comprising at least 95 wt %, yet more preferably comprising at least 99 wt %, of the instant polypropylene composition.

The above described polypropylene composition is suitable for the production of blown films as well as cast films.

Description of Film Production by Blown Film Technology

The above described composition is capable of being manufactured into water or air quench blown films, preferably air quenched blown films, on typical polyethylene blown film production equipment.

In principle the process comprising the steps of (i) blowing up a tube of molten material with air perpendicularly to the upwards direction from a side-fed blown film die;

(ii) cooling it down with water contact cooling ring or air quench;

(iii) folding it and guiding it over deflector rolls onto the winder.

In the blown film process the polypropylene composition melt is extruded through an annular die and blown into a tubular film by forming a bubble which is collapsed between nip rollers after solidification. The blown extrusion can be preferably effected at a temperature in the range 160° C. to 240° C., and cooled by water or preferably by blowing gas (generally air) at a temperature of 10° C. to 50° C. to provide a frost line height of 0.5 to 8 times the diameter of the die. The blow up ratio should generally be in the range of from 1.5 to 4, such as from 2 to 4, preferably 2.5 to 3.5.

Description of Film Production by Cast Film Technology

In this most simple technology for producing polymer films, the molten blend is extruded through a slot die fed by a (normally single-screw) extruder onto a first cooled roll, the so-called chill-roll. From this roll, the already solidified film is taken up by a second roll (nip roll or take-up roll) and transported to a winding device after trimming the edges. Only a very limited amount of orientation is created in the film, which is determined by the ratio between die thickness and film thickness or the extrusion speed and the take-up speed, respectively.

Due to its technical simplicity, cast film technology is a very economical and easy-to-handle process. The films resulting from this technology are characterised by good transparency and rather isotropic mechanical properties (limited stiffness, high toughness).

Summing up the process comprises the steps of i) pouring or spreading a solution, hot-melt or dispersion of a material onto a temporary carrier ii) hardening the material, and iii) stripping the hardened film from the surface of the carrier.

In case a film is produced by cast film technology the molten polypropylene composition is extruded through a slot extrusion die onto a chill roll to cool the polypropylene composition to a solid film. Typically the polypropylene composition is firstly compressed and liquefied in an extruder, it being possible for any additives to be already added to the polypropylene composition or introduced at this stage via a masterbatch. The melt is then forced through a flat-film die (slot die), and the extruded film is taken off on one or more take-off rolls, during which it cools and solidifies. It has proven particularly favorable to keep the take-off roll or rolls, by means of which the extruded film is cooled and solidified, at a temperature from 10° C. to 50° C., preferably from 15° C. to 40° C.

Mono-layer films having a thickness of 5 to 300 µm, preferably 10 to 200 µm, more preferably 20 to 150 µm are suitable according to the present invention.

It has been found that such polypropylene composition according to the present invention provides the film material made thereof with a combination of low sealing initiation temperature (SIT), high hot-tack and beneficial mechanical properties, i.e. high dart drop strength (DDI) and acceptable tensile modulus in machine direction (MD) of the film.

It has been further found that such polypropylene composition according to the present invention provides the film material made thereof with sufficient thermal stability to enable sterilization treatment.

Thus films, respectively articles according to the present invention comprising the above defined polypropylene composition are suitable for being sterilized.

Therefore the present invention is also directed to a sterilizable or sterilized article, preferably to a sterilizable or sterilized film, like a sterilizable or sterilized film.

In a further aspect the present invention is related to the use of the mono-layer films according to the invention for lamination films or multilayer films for packaging films and medical/hygienic films, wherein the mono-layer films according to the invention comprise at least one layer.

In one further aspect the present invention is related to the use of the monolayer films according to the invention as sealing layer in a polypropylene multi-layer film, which can be manufactured either by co-extrusion or lamination.

Further, the invention is also directed to a multi-layer film construction, comprising an unoriented mono-layer film as defined above as an outermost layer, i.e as sealing layer.

For being able to serve as a sealing layer in a multi-layer film construction, such an unoriented mono-layer film comprising the inventive polypropylene composition shall preferably have a sealing initiation temperature (SIT) in the range of from 50° C. to less than 100° C., more preferably in the range of from 50° C. to less than 95° C., even more preferably in the range of from 55° C. to less than 90° C. and yet more preferably in the range of from 55° C. to 85° C., like in the range of from 60° C. to 80° C., such as in the range of from 60° C. to 75° C. and most preferably in the range of from 65° C. to 70° C.

Unoriented mono-layer films comprising the polypropylene composition of the present invention suitably have a hot-tack force in the range of from 2.8 to 7.0 N (measured on a 50 µm blown film). The hot-tack force of the polypropylene composition containing films is measured according to the method description explained in the examples section of this document.

It is preferred that the hot-tack force measured on a 50 µm blown film is in the range of from 3.2 to 6.5 N, more preferably in the range of from 3.3 to 6.0 N and even more preferably in the range of from 3.5 to 5.5 N.

A suitable lower limit is 2.8 N, preferably 3.2 N, more preferably 3.3 N and even more preferably 3.5 N. A suitable upper limit is 7.0 N, preferably 6.5 N, more preferably 6.0 N and even more preferably 5.5 N.

Further, unoriented mono-layer films comprising the polypropylene composition of the present invention have a hot-tack temperature suitably in the range of from less than 98° C. (measured on a 50 µm blown film). The hot-tack temperature of the polypropylene composition containing films is measured according to the method description explained in the Examples section of this document.

It is preferred that the hot-tack temperature measured on a 50 µm blown film is in the range of from 50° C. to 95° C., more preferably in the range of from 50° C. to 90° C. and even more preferably in the range of from 60° C. to 85° C., like in the range of from 60° C. to 80° C., and most preferably in the range of from 65° C. to 75° C.

Additionally, unoriented mono-layer films comprising the polypropylene composition of the present invention suitably have a high dart drop strength (DDI) (measured on a 50 µm blown film). The dart drop strength is measured using ASTM D1709, method A as described below in the Examples section. It is preferred that the dart drop strength measured on a 50 µm blown film is in the range of from 100 g to 900 g, more preferably in the range of from 120 g to 900 g, and even more preferably in the range of from 150 g to 700 g, like in the range of from 170 g to 500 g, and most preferably in the range of from 185 g to 350 g.

Still further, unoriented mono-layer films comprising the polypropylene composition of the present invention suitably have a sufficiently high tensile modulus in machine direction (MD) (measured on a 50 µm blown film). The tensile modulus (MD) is measured according to ISO 527-3 on blown films with a thickness of 50 µm at a cross head speed of 100 mm/min. It is preferred that tensile modulus (MD) measured on a 50 µm blown film is in the range of from 100 MPa to 385 MPa, more preferably in the range of from 100 MPa to 345 MPa, and even more preferably in the range of from 150 MPa to 295 MPa, and most preferably in the range of from 150 MPa to 245 MPa.

A multi-layer film construction comprising at least one layer comprising the inventive polypropylene composition is preferably produced by a lamination process or by multi-layer co-extrusion followed by film casting or film blowing. In this case, at least one of the outermost layers of said multi-layer film construction serving as sealing layer(s) shall comprise the inventive polypropylene composition as defined above. The inventive multilayer film construction shall preferably have a thickness in the range of 30 to 500 µm, more preferably in the range of 50 to 400 µm, like in the range of 60 to 300 µm. The sealing layer(s) comprising the inventive polypropylene composition shall preferably have a thickness in the range of 3 to 50 µm, more preferably in the range of 5 to 30 µm, like in the range of 8 to 25 µm.

Films and/or multi-layer film constructions according to the present invention shall preferably be used for flexible packaging systems, such as bags or pouches for food and pharmaceutical packaging or medical articles in general.

EXAMPLE SECTION

1. Determination Methods a) Xylene Cold Solubles Fraction at Room Temperature (XCS, wt %)

The amount of polymer fraction soluble in xylene is determined according to ISO 16152:2005.

b) Melt Flow Rate (MFR$_2$)

The melt flow rate is the quantity of polymer in grams which the test apparatus standardized to ISO 1133 extrudes within 10 minutes at a certain temperature under a certain load.

The melt flow rate MFR$_2$ of the propylene polymer is measured at 230° C. with a load of 2.16 kg (MFR230° C./2.16) according to ISO 1133.

The melt flow rate MFR$_2$ of ethylene-based plastomer is measured at 190° C. with a load of 2.16 kg (MFR190° C./2.16) according to ISO 1133.

The melt flow rate MFR$_2$ of the polypropylene composition is measured at 230° C. with a load of 2.16 kg (MFR230° C./2.16) according to ISO 1133.

c) Density

The density is measured according to ISO 1183D. The samples preparation is carried out by compression moulding according to ISO 1872-2:2007.

d) Comonomer Content

Quantitative nuclear-magnetic resonance (NMR) spectroscopy was used to quantify the comonomer content of the polymers.

Comonomer Content Quantification of Poly(Propylene-Co-Ethylene) Copolymers

Quantitative $^{13}$C{$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probe head at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent {8}. To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme {3, 4}. A total of 6144 (6 k) transients were acquired per spectra.

Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed {7}.

The comonomer fraction was quantified using the method of Wang et. al. {6} through integration of multiple signals across the whole spectral region in the $^{13}$C{$^1$H} spectra. This method was chosen for its robust nature and ability to account for the presence of regiodefects when needed. Integral regions were slightly adjusted to increase applicability across the whole range of encountered comonomer contents. For systems where only isolated ethylene in PPEPP sequences was observed the method of Wang et al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et al. {6}. Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

Bibliographic References:
1) Busico, V., Cipullo, R., Prog. Polym. Sci. 26 (2001) 443.
2) Busico, V., Cipullo, R., Monaco, G., Vacatello, M., Segre, A. L., Macromolecules 30 (1997) 6251.
3) Zhou, Z., Kuemmerle, R., Qiu, X., Redwine, D., Cong, R., Taha, A., Baugh, D. Winniford, B., J. Mag. Reson. 187 (2007) 225.
4) Busico, V., Carbonniere, P., Cipullo, R., Pellecchia, R., Severn, J., Talarico, G., Macromol. Rapid Commun. 2007, 28, 1128.
5) Resconi, L., Cavallo, L., Fait, A., Piemontesi, F., Chem. Rev. 2000, 100, 1253.
6) Wang, W-J., Zhu, S., Macromolecules 33 (2000), 1157.
7) Cheng, H. N., Macromolecules 17 (1984), 1950.
8) Singh, G., Kothari, A., Gupta, V., Polymer Testing 28 5 (2009), 475.
9) Kakugo, M., Naito, Y., Mizunuma, K., Miyatake, T. Macromolecules 15 (1982) 1150.
10) Randall, J. Macromol. Sci., Rev. Macromol. Chem. Phys. 1989, C29, 201.
11) Resconi, L., Cavallo, L., Fait, A., Piemontesi, F., Chem. Rev. 2000, 100, 1253.

Comonomer Content Poly(Propylene-Co-Ethylene-Co-Butene)

Quantitative $^{13}C\{^{1}H\}$ NMR spectra recorded in the molten-state using a Bruker Advance III 500 NMR spectrometer operating at 500.13 and 125.76 MHz for $^1H$ and $^{13}C$ respectively. All spectra were recorded using a 13C optimised 7 mm magic-angle spinning (MAS) probe head at 180° C. using nitrogen gas for all pneumatics.

Approximately 200 mg of material was packed into a 7 mm outer diameter zirconia MAS rotor and spun at 4.5 kHz. This setup was chosen primarily for the high sensitivity needed for rapid identification and accurate quantification{1, 2, 6} Standard single-pulse excitation was employed utilising the NOE at short recycle delays{3, 1} and the RS-HEPT decoupling scheme{4, 5}. A total of 1024 (1 k) transients were acquired per spectra.

Quantitative $^{13}C\{^{1}H\}$ NMR spectra were processed, integrated and relevant quantitative properties determined from the integrals. All chemical shifts are internally referenced to the methyl isotactic pentad (mmmm) at 21.85 ppm. Characteristic signals corresponding to regio defects were not observed{11}. The amount of propene was quantified based on the main $S\alpha\alpha$ methylene sites at 44.1 ppm:

$$P\text{total}=I_{S\alpha\alpha}$$

Characteristic signals corresponding to the incorporation of 1-butene were observed and the comonomer content quantified in the following way. The amount isolated 1-butene incorporated in PPBPP sequences was quantified using the integral of the $\alpha B2$ sites at 44.1 ppm accounting for the number of reporting sites per comonomer:

$$B=I_{\alpha B2}/2$$

The amount consecutively incorporated 1-butene in PPBBPP sequences was quantified using the integral of the $\alpha\alpha B2$ site at 40.5 ppm accounting for the number of reporting sites per comonomer:

$$BB=2*I_{\alpha\alpha B2}$$

The total 1-butene content was calculated based on the sum of isolated and consecutively incorporated 1-butene:

$$B\text{total}=B+BB$$

The total mole fraction of 1-butene in the polymer was then calculated as: $fB=(B\text{total}/(E\text{total}+P\text{total}+B\text{total}))$ Characteristic signals corresponding to the incorporation of ethylene were observed and the comonomer content quantified in the following way. The amount isolated ethylene incorporated in PPEPP sequences was quantified using the integral of the $S\alpha\gamma$ sites at 37.9 ppm accounting for the number of reporting sites per comonomer:

$$E=I_{S\alpha\gamma}/2$$

With no sites indicative of consecutive incorporation observed the total ethylene comonomer content was calculated solely on this quantity:

$$E\text{total}=E$$

The total mole fraction of ethylene in the polymer was then calculated as:

$$fE=(E\text{total}/(E\text{total}+P\text{total}+B\text{total}))$$

The mole percent comonomer incorporation was calculated from the mole fractions:

$$B[\text{mol \%}]=100*fB$$

$$E[\text{mol \%}]=100*fE$$

The weight percent comonomer incorporation was calculated from the mole fractions:

$$B[\text{wt \%}]=100*(fB*56.11)/((fE*28.05)+(fB*56.11)+((1-(fE+fB))*42.08))$$

$$E[\text{wt \%}]=100*(fE*28.05)/((fE*28.05)+(fB*56.11)+((1-(fE+fB))*42.08))$$

Bibliographic References:
1) Klimke, K., Parkinson, M., Piel, C., Kaminsky, W., Spiess, H. W., Wilhelm, M., Macromol. Chem. Phys. 2006; 207:382.
2) Parkinson, M., Klimke, K., Spiess, H. W., Wilhelm, M., Macromol. Chem. Phys. 2007; 208:2128.
3) Pollard, M., Klimke, K., Graf, R., Spiess, H. W., Wilhelm, M., Sperber, O., Piel, C., Kaminsky, W., Macromolecules 2004; 37:813.
4) Filip, X., Tripon, C., Filip, C., J. Mag. Resn. 2005, 176, 239.
5) Griffin, J. M., Tripon, C., Samoson, A., Filip, C., and Brown, S. P., Mag. Res. in Chem. 2007 45, S1, S198.
6) Castignolles, P., Graf, R., Parkinson, M., Wilhelm, M., Gaborieau, M., Polymer 50 (2009) 2373.
7) Busico, V., Cipullo, R., Prog. Polym. Sci. 26 (2001) 443.
8) Busico, V., Cipullo, R., Monaco, G., Vacatello, M., Segre, A. L., Macromolecules 30 (1997) 6251.
9) Zhou, Z., Kuemmerle, R., Qiu, X., Redwine, D., Cong, R., Taha, A., Baugh, D. Winniford, B., J. Mag. Reson. 187 (2007) 225.

10) Busico, V., Carbonniere, P., Cipullo, R., Pellecchia, R., Severn, J., Talarico, G., Macromol. Rapid Commun. 2007, 28, 1128.

11) Resconi, L., Cavallo, L., Fait, A., Piemontesi, F., Chem. Rev. 2000, 100, 1253.

Comonomer Content Quantification of Poly(Ethylene-Co-1-Octene) Copolymers

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probe-head at 150° C. using nitrogen gas for all pneumatics.

Approximately 200 mg of material was packed into a 7 mm outer diameter zirconia MAS rotor and spun at 4 kHz. This setup was chosen primarily for the high sensitivity needed for rapid identification and accurate quantification.[1],[2],[3],[4] Standard single-pulse excitation was employed utilising the transient NOE at short recycle delays of 3s[5],[1] and the RS-HEPT decoupling scheme.[6],[7] A total of 1024 (1 k) transients were acquired per spectrum. This setup was chosen due to its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm.[8]

Characteristic signals corresponding to the incorporation of 1-octene were observed[8],[9],[10],[11],[12] and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.32 ppm. This integral is assigned to the unresolved signals corresponding to both $*B6$ and $*\beta B6B6$ sites of isolated (EEOEE) and isolated double non-consecutive (EEOEOEE) 1-octene sequences respectively. To compensate for the influence of the two $*\beta B6B6$ sites the integral of the $\beta\beta B6B6$ site at 24.7 ppm is used:

$$O = I_{*B6+*\beta B6B6} - 2*I_{\beta\beta B6B6}$$

Characteristic signals resulting from consecutive 1-octene incorporation, i.e. EEOOEE comonomer sequences, were also observed. Such consecutive 1-octene incorporation was quantified using the integral of the signal at 40.48 ppm assigned to the $\alpha\alpha B6B6$ sites accounting for the number of reporting sites per comonomer:

$$OO = 2*I_{\alpha\alpha B6B6}$$

Characteristic signals resulting from isolated non-consecutive 1-octene incorporation, i.e. EEOEOEE comonomer sequences, were also observed. Such isolated non-consecutive 1-octene incorporation was quantified using the integral of the signal at 24.7 ppm assigned to the $\beta\beta B6B6$ sites accounting for the number of reporting sites per comonomer:

$$OEO = 2*I_{\beta\beta B6B6}$$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the $\alpha\alpha\gamma B6B6B6$ sites accounting for the number of reporting sites per comonomer:

$$OOO = 3/2*I_{\alpha\alpha\gamma B6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total} = O + OO + OEO + OOO$$

Characteristic signals resulting from saturated end-groups were observed. Such saturated end-groups were quantified using the average integral of the two resolved signals at 22.84 and 32.23 ppm. The 22.84 ppm integral is assigned to the unresolved signals corresponding to both 2B6 and 2S sites of 1-octene and the saturated chain end respectively. The 32.23 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S = (1/2)*(I_{2S+2B6} + I_{3S+3B6} - 2*O_{total})$$

The ethylene comonomer content was quantified using the integral of the bulk methylene (bulk) signals at 30.00 ppm. This integral included the γ and 4B6 sites from 1-octene as well as the δ+ sites. The total ethylene comonomer content was calculated based on the bulk integral and compensating for the observed 1-octene sequences and end-groups:

$$E_{total} = (1/2)*[I_{bulk} + 2*O + 1*OO + 3*OEO + 0*OOO + 3*S]$$

It should be noted that compensation of the bulk integral for the presence of isolated triple-incorporation (EEOOOEE) 1-octene sequences is not required as the number of under and over accounted ethylene units is equal.

The total mole fraction of 1-octene in the polymer was then calculated as:

$$fO = (O_{total}/(E_{total} + O_{total}))$$

The total comonomer incorporation of 1-octene in weight percent was calculated from the mole fraction in the standard manner:

$$O[wt\%] = 100*(fO*112.21)/((fO*112.21) + ((1-fO)*28.05))$$

[1] Klimke, K., Parkinson, M., Piel, C., Kaminsky, W., Spiess, H. W., Wilhelm, M., Macromol. Chem. Phys. 2006; 207:382.

[2] Parkinson, M., Klimke, K., Spiess, H. W., Wilhelm, M., Macromol. Chem. Phys. 2007; 208:2128.

[3] Castignolles, P., Graf, R., Parkinson, M., Wilhelm, M., Gaborieau, M., Polymer 50 (2009) 2373

[4] NMR Spectroscopy of Polymers: Innovative Strategies for Complex Macromolecules, Chapter 24, 401 (2011)

[5] Pollard, M., Klimke, K., Graf, R., Spiess, H. W., Wilhelm, M., Sperber, O., Piel, C., Kaminsky, W., Macromolecules 2004; 37:813.

[6] Filip, X., Tripon, C., Filip, C., J. Mag. Resn. 2005, 176, 239

[7] Griffin, J. M., Tripon, C., Samoson, A., Filip, C., and Brown, S. P., Mag. Res. in Chem. 2007 45, S1, S198

[8] J. Randall, Macromol. Sci., Rev. Macromol. Chem. Phys. 1989, C29, 201.

[9] Liu, W., Rinaldi, P., McIntosh, L., Quirk, P., Macromolecules 2001, 34, 4757

[10] Qiu, X., Redwine, D., Gobbi, G., Nuamthanom, A., Rinaldi, P., Macromolecules 2007, 40, 6879

[11] Busico, V., Carbonniere, P., Cipullo, R., Pellecchia, R., Severn, J., Talarico, G., Macromol. Rapid Commun. 2007, 28, 1128

[12] Zhou, Z., Kuemmerle, R., Qiu, X., Redwine, D., Cong, R., Taha, A., Baugh, D. Winniford, B., J. Mag. Reson. 187 (2007) 225 e) DSC Analysis, Melting Temperature (Tm) and Crystallization Temperature (Tc):

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30° C. to +225° C.

Crystallization temperature and heat of crystallization (Hc) are determined from the cooling step, while melting temperature and heat of fusion (Hf) are determined from the second heating step.

f) Blown Films

Blown films were made on a Collin blown film line. This line has a screw diameter of 30 millimeters (mm), L/D of 30, a die diameter of 60 mm, a die gap of 1.5 mm and a duo-lip cooling ring. The film samples were produced at 190° C. with an average thickness 5 of 50 µm, with a 2.5 blow-up-ratio and an output rate of about 8 kilograms per hour (kg/h).

g) Hot-Tack Force

The hot-tack force was determined according to ASTM F1921-12—Method B on a J&B Hot-Tack Tester on a 50 µm thickness film produced on a monolayer blown film line.

All film test specimens were prepared in standard atmospheres for conditioning and testing at 23° C. (±2° C.) and 50% (±10%) relative humidity.

The minimum conditioning time of test specimen in standard atmosphere before start testing is at least 16 h. The minimum storage time between extrusion of film sample and start testing is at least 88 h.

The hot tack measurement determines the strength of heat seals formed in the films, immediately after the seal has been made and before it cools to ambient temperature.

The hot-tack measurement was performed under the following conditions.

Film Specimen width: 25.4 mm.
Seal bar length: 50 mm
Seal bar width: 5 mm
Seal bar shape: flat
Seal Pressure: 0.3 N/mm$^2$.
Seal Time: 0.5 sec.
Cool time: 99 sec.
Peel Speed: 200 mm/sec.
Start temperature: 50° C.
End temperature: 160° C.
Increments: 10° C.

The hot tack force was measured as a function of temperature within the temperature range and with temperature increments as indicated above. The number of test specimens were at least 3 specimens per temperature. The output of this method is a hot tack curve; a force vs. temperature curve.

The hot tack force (HTF) is evaluated from the curve as the highest force (maximum peak value) with failure mode "peel".

The hot tack temperature (HTT) is evaluated from the curve as the highest temperature (maximum peak value) with failure mode "peel".

h) Sealing Initiation Temperature (SIT); Sealing End Temperature (SET), Sealing Range:

The method determines the sealing temperature range (sealing range) of polypropylene films, in particular blown films or cast films according to ASTM F1921-12. Seal pressure, cool time and peel speed are modified as stated below. The sealing temperature range is the temperature range, in which the films can be sealed according to conditions given below.

The lower limit (heat sealing initiation temperature (SIT)) is the sealing temperature at which a sealing strength of >5 N is achieved. The upper limit (sealing end temperature (SET)) is reached, when the films stick to the sealing device.

The sealing range is determined on a J&B Universal Sealing Machine Type 3000 with a blown film of 50 µm thickness with the following further parameters:

Specimen width: 25.4 mm
Seal Pressure: 0.1 N/mm$^2$
Seal Time: 0.1 sec
Cool time: 99 sec
Peel Speed: 10 mm/sec
Start temperature: 50° C.
End temperature: 150° C.
Increments: 10° C.

specimen is sealed A to A at each sealbar temperature and seal strength (force) is determined at each step.

The temperature is determined at which the seal strength reaches 5 N.

i) Tensile Modulus

Tensile moduli in machine (MD) direction were determined according to ISO 527-3 on blown films with a thickness of 50 µm at a cross head speed of 100 mm/min.

j) Dart Drop Strength (DDI)

Dart-drop is measured using ASTM D1709, method A (Alternative Testing Technique) from the film samples. A dart with a 38 mm diameter hemispherical head is dropped from a height of 0.66 m onto a film clamped over a hole. Successive sets of twenty specimens are tested. One weight is used for each set and the weight is increased (or decreased) from set to set by uniform increments. The weight resulting in failure of 50% of the specimens is calculated and reported.

2. Examples a) Propylene Polymer

The propylene polymer for the Inventive Example (IE) and the comparative examples (CE) was made in a Borstar PP pilot plant in the slurry loop reactor only with an upstream prepolymerization step.

The gas phase reactor (GPR) was used as high pressure (HP) flash with pressure of 1700 kPa and bed level of 70 cm. 35 kg/h propylene flush was used to keep the direct feed line open between the loop and GPR.

The catalyst used was Avant ZN180M, provided by LyondelBasell. Cocatalyst was TEAL and the external donor was Donor D Table 1 shows the polymerization data for the Propylene-ethylene-1-butene terpolymer.

TABLE 1

Polymerization conditions for the propylene-ethylene-1-butene terpolymer

| Prepolymerization: | unit | |
| --- | --- | --- |
| Temperature | ° C. | 20 |
| Pressure | kPa | 5246 |
| Catalyst feed | g/h | 1.3 |
| Donor D feed | g/t C$_3$ | 40.2 |
| TEAL feed | g/t C$_3$ | 169.6 |
| Al/Donor | mol/mol | 8.4 |
| Al/Ti | mol/mol | 202.6 |
| Residence Time | h | 0.4 |
| C3 feed | kg/h | 63.1 |

TABLE 1-continued

Polymerization conditions for the propylene-ethylene-1-butene terpolymer

| Prepolymerization: | unit | |
|---|---|---|
| H2 feed | g/h | 0.98 |
| Production rate | kg/h | 0.9 |
| Loop: | | |
| Temperature | °C. | 63 |
| Pressure | kPa | 5125 |
| C3 feed | kg/h | 148.3 |
| C4 feed | kg/h | 45.2 |
| H2 feed | g/h | 4.5 |
| C2 feed | kg/h | 1.4 |
| Feed ratio H2/C3 | mol/kmol | 0.6 |
| Feed ratio C2/C3 | mol/kmol | 14.5 |
| Feed ratio C4/C3 | mol/kmol | 228.9 |
| Production rate | kg/h | 32.4 |
| Catalyst productivity after loop | kg/g | 25.3 |
| Catalyst activity in loop | kg/g*h | 84.5 |
| Polymer residence time | h | 0.9 |
| $MFR_2$ | g/10 min | 2.0 |
| Total C2 | wt % | 1.6 |
| Total C4 | wt % | 7.1 |
| Gas phase reactor: | | |
| Temperature | °C. | 75 |
| Pressure | kPa | 1697 |
| Bed level | cm | 68 |

The so obtained terpolymer was melt blended with the below cited additives on a co-rotating twin screw extruder type Coperion ZSK 40 (screw diameter 40 mm, L/D ratio 38) at temperatures in the range of 170-190° C., using a high intensity mixing screw configuration with two sets of kneading blocks.

The terpolymer thus contained 500 ppm of Irganox 1010 (Pentaerythrityl-tetrakis(3-(3',5'-ditert.butyl-4-hydroxyphenyl)-propionate, CAS No. 6683-19-8), 500 ppm of Irgafos 168 (Tris(2,4-di-t-butylphenyl) phosphite, CAS No. 31570-04-4) and 400 ppm of Calcium stearate (CAS. No. 1592-23-0) as additives.

The terpolymer data described in Table 2 are measured on the pellets obtained after melt 10 blending as described above.

TABLE 2

Properties of the propylene-ethylene-1-butene terpolymer

| Properties | unit | |
|---|---|---|
| Total C2 | wt % | 1.6 |
| Total C4 | wt % | 7.1 |
| $MFR_2$ | g/10 min | 2.0 |
| Tm | °C. | 135 |
| XCS | wt % | 10.7 |
| Tc | °C. | 95 | b) Ethylene-Based Plastomer

As ethylene-based plastomer Queo™ 8230, commercially available from Borealis was used. Queo™ 8230 is an ethylene-based octene-1 plastomer, produced in a solution polymerization process using a metallocene catalyst, with a MFR(190/2.16) of 30 g/10 min, a density of 0.882 g/cm³ and a melting point of 76° C.

c) Polypropylene Composition

The propylene-ethylene-1-butene terpolymer from a) and the ethylene-based plastomer from b) (when used) were directly dry-blended on the Collin blown film line and 50 μm blown films were produced with the set-up as described in the method part under f).

For the composition of the inventive example IE1 65 wt % propylene-ethylene-1-butene terpolymer and 35 wt % ethylene-based plastomer were used. For the composition of comparative example CE2 90 wt % propylene-ethylene-1-butene terpolymer and 10 wt % ethylene-based plastomer and the composition of comparative example CE3 100 wt % propylene-ethylene-1-butene terpolymer were used.

In Table 3 the compositions IE1, CE2 and CE3 and their properties are shown.

TABLE 3

Compositions and properties of IE1, CE2 and CE3

| Example: | unit | IE1 | CE2 | CE3 |
|---|---|---|---|---|
| Terpolymer | wt % | 65 | 90 | 100 |
| Plastomer | wt % | 35 | 10 | 0 |
| Composition properties: | | | | |
| $MFR_2$ | g/10 min | 6.5 | 2.8 | 2.0 |
| Tm | °C. | 132 | 134 | 135 |
| XCS | wt % | 41 | 19 | 10.7 |
| Blown film properties: | | | | |
| Dart drop strength | g | 192 | 97 | 71 |
| Tensile modulus (MD) | MPa | 211 | 438 | 598 |
| Hot-tack force | N | 4.1 | 5.0 | 2.5 |
| Hot-tack temperature | °C. | 71 | 98 | 113 |
| SIT | °C. | 67 | 105 | 114 |

It can be seen from Table 3 that the inventive example IE1 shows an improved balance of properties in regard of mechanical properties and sealing behaviour with a dramatically improved sealing behaviour at good mechanical properties. The SIT drops to a very low 67° C. at a still very high hot-tack force. The mechanical properties in DDI and tensile modulus are still acceptably high.

The invention claimed is:

1. A polypropylene composition comprising:
   (A) a polymer blend comprising:
   (A-1) from 55.0 wt % to 75.0 wt %, based on a total amount of the polymer blend, of a propylene polymer including two different comonomer units selected from ethylene and alpha-olefins having from 4 to 12 carbon atoms randomly distributed in a propylene polymer chain comprising,
   (i) ethylene-derived comonomer units in an amount of 0.3 wt % to 4.0 wt %, based on a total amount of monomer units in the propylene polymer, and
   (ii) comonomer units derived from alpha-olefins having from 4 to 12 carbon atoms in an amount of 4.0 wt % to 16.0 wt %, based on a total amount of monomer units in the propylene polymer,
   wherein the propylene polymer has a melt flow rate $MFR_2$ in a range of 0.5 g/10 min to 20.0 g/10 min, determined according to ISO 1133 at a temperature of 230° C. and a load of 2.16 kg; and
   (A-2) from 25.0 wt % to 45.0 wt %, based on a total amount of the polymer blend, of an ethylene-based plastomer having a density of from 0.850 g/cm³ to 0.915 g/cm³, determined according to ISO 1183, and a melt flow rate $MFR_2$ in a range of 5.0 g/10 min to 50.0 g/10 min, determined according to ISO 1133 at a temperature of 190° C. and a load of 2.16 kg; and
   (B) optionally one or more additives in a total amount of from 0.0 to 5.0 wt %, based on a total amount of the polypropylene composition, selected from the group consisting of slip agents, anti-block agents, UV stabilizers, alpha- and/or beta-nucleating agents, antistatic agents and antioxidants, wherein a $MFR_2$ ratio of a $MFR_2$ of the polypropylene composition $MFR_{final}$ to a $MFR_2$ of the propylene polymer $MFR_{polymer}$ greater than 1.2.

2. The polypropylene composition according to claim 1, wherein a weight ratio of the propylene polymer and the ethylene-based plastomer in the polymer blend is in a range of 75:25 to 55:45.

3. The polypropylene composition according to claim 1, wherein the polypropylene composition consists of:
the polymer blend (A) which comprises:
(A-1) from 55.0 wt % to 75.0 wt % of a random terpolymer of propylene with ethylene and 1-butene as comonomer units or a random terpolymer of propylene with ethylene and 1-hexene as comonomer units (A-1-b) comprising,
   a) ethylene-derived comonomer units in an amount of 0.3 wt % to 4.0 wt %, based on a total amount of monomer units in the propylene polymer, and
   b) 1-butene or 1-hexene derived comonomer units in an amount of 4.0 wt % to 16.0 wt %, based on a total amount of monomer units in the propylene polymer,
wherein the random terpolymer (A-1) has a melt flow rate $MFR_2$ in a range of 0.5 g/10 min to 20.0 g/10 min, determined according to ISO 1133 at a temperature of 230° C. and a load of 2.16 kg, a melting temperature Tm measured via DSC according to ISO 11357 of 130° C. to 140° C., a xylene cold soluble (XCS) amount in a range of 5.0 wt % to 15.0 wt % (measured according to ISO 16152, 2005, at 25° C.) and a crystallization temperature Tcr measured via DSC according to ISO 11357 of 85° C. to 100° C.; and
(A-2) from 25.0 wt % to 45.0 wt % of a plastomer which is a copolymer of ethylene and 1-octene,
wherein the copolymer of ethylene and 1-octene (A-2) has a density of in a range of from 0.850 g/cm³ to 0.915 g/cm³ and a melt flow rate $MFR_2$ in a range of 5.0 g/10 min to 50.0 g/10 min, determined according to ISO 1133 at a temperature of 190° C. and a load of 2.16 kg; and (B) optionally one or more additives in a total amount of from 0.0 to 5.0 wt %, based on a total amount of the polypropylene composition, selected from the group consisting of slip agents, anti-block agents, UV stabilizers, alpha- and/or beta-nucleating agents, antistatic agents and antioxidants wherein the polypropylene composition has a melt flow rate $MFR_2$ in a range of 1.0 g/10 min to 20.0 g/10 min, determined according to ISO 1133 at a temperature of 230° C. and a load of 2.16 kg, a melting temperature Tm, measured via DSC according to ISO 11357 of 125° C. to 140° C., a xylene cold soluble (XCS) amount in a range of 20 wt % to 50 wt % (measured according to ISO 16152, 2005, at 25° C.).

4. A process for preparing a polypropylene composition according to claim 1, wherein the process comprises the steps of:
(i) preparing the propylene polymer by polymerizing propylene and two different comonomer units selected from ethylene and alpha-olefins having from 4 to 12 carbon atoms in the presence of a Ziegler-Natta catalyst,
(ii) mixing said propylene polymer with the ethylene-based plastomer, optionally in the presence of one or more additives, to obtain a mixture of said propylene polymer and ethylene-based plastomer, and
(iii) extruding said mixture to obtain said polypropylene composition.

5. An article comprising the polypropylene composition according to claim 1.

6. The article according to claim 5, wherein the article is an unoriented mono-layered or multi-layered film.

7. The article according to claim 6, wherein the unoriented mono-layered or multi-layered film is a cast film or a blown film.

8. The article according to claim 6, wherein the film has a sealing initiation temperature SIT of from 50° C. to 85° C.

9. The article according to claim 6, wherein the film has a hot-tack force, determined on a 50 μm blown film, of from 2.8 N to 7.0 N.

10. The article according to claim 6, wherein the film has a hot-tack temperature, determined on a 50 μm blown film, of 50° C. to 95° C.

11. The article according to claim 6, wherein the film has a dart drop strength, determined on a 50 μm blown film, of from 100 g to 900 g.

12. The article according to claim 6, wherein the film has a tensile modulus, determined in machine direction on a 50 μm blown film, of from 100 MPa to 385 MPa.

13. The article according to claim 6, wherein the article is a multi-layered film comprising a sealing layer, which comprises the polypropylene composition.

14. A polypropylene composition consisting of:
(A) a polymer blend comprising:
(A-1) from 55.0 wt % to 75.0 wt % of a random terpolymer of propylene with ethylene and 1-butene as comonomer units or a random terpolymer of propylene with ethylene and 1-hexene as comonomer units (A-1-b) comprising:
   a) ethylene-derived comonomer units in an amount of 0.3 wt % to 4.0 wt %, based on a total amount of monomer units in the propylene polymer, and
   b) 1-butene or 1-hexene derived comonomer units in an amount of 4.0 to 16.0 wt %, based on a total amount of monomer units in the propylene polymer,
wherein the random terpolymer (A-1) has a melt flow rate $MFR_2$ in a range of 0.5 g/10 min to 20.0 g/10 min, determined according to ISO 1133 at a temperature of 230° C. and a load of 2.16 kg, a melting temperature Tm measured via DSC according to ISO 11357 of 130° C. to 140° C., a xylene cold soluble (XCS) amount in a range of 5.0 wt % to 15.0 wt % (measured according to ISO 16152, 2005, at 25° C.) and a crystallization temperature Tcr measured via DSC according to ISO 11357 of 85° C. to 100° C.; and
(A-2) from 25.0 wt % to 45.0 wt % of a plastomer which is a copolymer of ethylene and 1-octene,
wherein the copolymer of ethylene and 1-octene (A-2) has a density in a range of from 0.850 g/cm³ to 0.915 g/cm³ and a melt flow rate $MFR_2$ in a range of 5.0 g/10 min to 50.0 g/10 min, determined according to ISO 1133 at a temperature of 190° C. and a load of 2.16 kg; and (B) optionally one or more additives in a total amount of from 0.0 to 5.0 wt %, based on a total amount of the polypropylene composition, selected from the group consisting of slip agents, anti-block agents, UV stabilizers, alpha- and/or beta-nucleating agents, antistatic agents and antioxidants, wherein the polypropylene composition has a melt flow rate $MFR_2$ in a range of 1.0 g/10 min to 20.0 g/10 min, determined according to ISO 1133 at a temperature of 230° C. and a load of 2.16 kg, a melting temperature Tm, measured via DSC according to ISO 11357 of 125° C. to 140° C., a xylene cold soluble (XCS) amount in a range of 20 wt % to 50 wt % (measured according to ISO 16152, 2005, at 25° C.).

* * * * *

UNITED STATES PATENT AND TRADEMARK OFFICE
CERTIFICATE OF CORRECTION

| | |
|---|---|
| PATENT NO. | : 11,505,686 B2 |
| APPLICATION NO. | : 16/955642 |
| DATED | : November 22, 2022 |
| INVENTOR(S) | : Gahleitner et al. |

It is certified that error appears in the above-identified patent and that said Letters Patent is hereby corrected as shown below:

On the Title Page

Item (72) Inventors: delete "Peter Niedersuss, Linz (AT)"
Insert --Peter Niedersüss, Linz (AT)--

Signed and Sealed this
Twelfth Day of September, 2023

Katherine Kelly Vidal
*Director of the United States Patent and Trademark Office*